United States Patent [19]

Bush et al.

[11] Patent Number: 5,387,633
[45] Date of Patent: Feb. 7, 1995

[54] STYRENE SODIUM STYRENE SULFONATE COPOLYMER FOR PLASTISOL SEALANT

[75] Inventors: Richard W. Bush, Columbia; Eugene E. Carney, Sykesville; Shao-Hai Wu, Ellicott City, all of Md.; Felek Jachimowicz, Brookline, Mass.; Timothy G. Grasel, Moorpark, Calif.; Tsutomu Takeuchi, Kanagawa, Japan

[73] Assignee: W. R. Grace & Co.-Conn., New York, N.Y.

[21] Appl. No.: 208,764

[22] Filed: Mar. 8, 1994

[51] Int. Cl.$^6$ .................... C08K 5/12; C08K 5/11; C08K 5/523

[52] U.S. Cl. ................... 524/296; 524/141; 524/143; 524/292; 524/297; 524/298; 524/314

[58] Field of Search ............... 524/141, 145, 292, 296, 524/297, 298, 314, 143, 547, 577; 526/287

[56] References Cited

U.S. PATENT DOCUMENTS

| | | | |
|---|---|---|---|
| 3,925,280 | 12/1975 | Lundberg | 524/577 |
| 4,014,847 | 3/1977 | Lundberg | 524/388 |
| 4,425,455 | 1/1984 | Turner | 524/423 |
| 4,525,522 | 6/1985 | Turner et al. | 524/547 |

OTHER PUBLICATIONS

Preparation of Highly Sulfonated Polystyrene Model Colloids; J. H. Kim et al. Journal of Polymer Science Part A: Polymer Chemistry, vol. 27, 3187–3199 (1989).

*Primary Examiner*—Peter Szekely
*Attorney, Agent, or Firm*—Valerie E. Looper

[57] ABSTRACT

Copolymers of styrene and sodium styrene sulfonate can be combined with a plasticizer to make a non-PVC plastisol sealant for containers.

12 Claims, No Drawings

STYRENE SODIUM STYRENE SULFONATE COPOLYMER FOR PLASTISOL SEALANT

FIELD OF THE INVENTION

This application relates to non-PVC plastisols. More specifically, it relates to copolymers made of styrene and sodium styrene sulfonate which can be used instead of polymers made of vinyl chloride ("PVC") to make plastisol sealants for containers.

BACKGROUND OF THE INVENTION

Container sealants are needed to preserve the quality of canned and bottled goods. At present, plastisols based on PVC are widely used because they offer good technical solutions to a number of problems faced by canners and bottlers. Plastisols made with PVC are flexible, exhibit good adhesion to metal, can be formulated as a low viscosity film or coating, do not add a taste or smell to a packaged food or beverage, and are relatively inexpensive to produce. On the other hand, the raw materials do contain chlorine, which has become the subject of environmental concern.

Chlorine, which is essential to life and is found in common table salt, is a highly reactive element which exerts a profound effect on molecules that contain it. Many chlorinated organic compounds are highly reactive, and many, including the vinyl chloride monomer used to make the PVC polymer, are carcinogens. Further, improper incineration of materials that contain PVC can produce hydrogen chloride (a corrosive acid) and dioxins (which are poisonous). Since many communities world-wide are incinerating municipal solid waste, there is a demand to reduce the use of PVC rather than depend upon the proper incineration of waste every time.

It can be seen, therefore, that there is a need for a non-PVC plastisol, particularly where environmental concerns exist.

Plastisols are essentially blends of finely divided thermoplastic polymers suspended in a liquid medium, or plasticizer. Plastisols are particularly useful as an aid to handling polymers which would otherwise exist in a highly viscous or semi-solid state. U.S. Pat. No. 3,925,280, issued to Lundberg et al. Dec. 9, 1975 discloses that broad classes of thermoplastic materials, including graft or block copolymers as well as various ionomers, can be powdered and then blended with plasticizers to produce a suspension which is useful for making thin layers or coatings. The suspension is simply applied to a surface of an article and heated to a softening point of the polymer. A liquid-solid transition occurs upon heating, producing a plasticized semi-rigid or elastomeric product of high strength.

Polystyrene is known for use in plastisols, but, as discussed in the comparative example below, the resulting physical properties are not usable in the present application.

In U.S. Pat. No. 4,014,847, issued to Lundberg et al. Mar. 29, 1977, it is further disclosed that certain polar plasticizers such as glycerol are compatible with various ionomers including sulfonated polystyrenes. No particular end use for the resulting suspensions is disclosed.

U.S. Pat. No. 4,425,455 issued to Turner et al. Jan. 10, 1984 discloses that sulfonated thermoplastic polymers, including copolymers of sodium styrene sulfonate with styrene, vinyl toluene or t-butyl styrene, can be blended with a polar cosolvent (plasticizer) for use in a drilling mud.

A method of making the styrene and sodium styrene sulfonate (Sty/NaSS) copolymers of the present invention is disclosed in J. H. Kim et al., "Preparation of Highly Sulfonated Polystyrene Model Colloids" J. Polymer Sci: Part A: Polymer Chemistry, Vol. 27, 3187–3199 (1989). End uses of the resulting materials are not discussed.

OBJECTS OF THE INVENTION

It is an object of the present invention to produce a non-PVC plastisol suitable for use as a sealant for containers.

This and other objects and advantages of the invention can be accomplished using sulfonated polystyrene ionomers in plastisols for use as sealants. The presently described materials exhibit good plastisol stability, fast fusion speed and high strength in the fused plastisol.

DETAILED DESCRIPTION OF THE INVENTION

Plastisols are useful as a means of handling polymers which are highly viscous and may be sensitive to heat. Processes utilizing plastisols can function as an alternative to other methods which employ massive machinery to extrude, mold or calender the highly viscous molten polymer. The plastisol is a suspension having a solids content of about 15–75 weight % of finely divided polymer in a compatible plasticizer. Polymer particle size is preferably about 10 to 50 microns in diameter. It is desirable that the suspension has a reasonable degree of shelf stability. That is, no substantial change in viscosity or physical appearance should occur at ambient temperature over a period of hours or days, depending on the application. The suspension can easily be coated or flowed onto an object and heated to induce a liquid-solid transition due to plasticization of the polymer. Upon cooling, the product is a plasticized semirigid or elastomeric product of high strength.

The Copolymers

Although styrene/sodium styrene sulfonate (Sty/NaSS) copolymers are known as well as their combination with plasticizers, the effective use of such copolymers in plastisols has not been described. The present copolymers are preferably prepared by emulsion polymerization of styrene and a metal salt of styrene sulfonic acid, preferably sodium styrene sulfonate, using a water soluble initiator. Typical examples of initiators include potassium persulfate, ammonium persulfate and t-butyl hydroperoxide. Of these, potassium persulfate is preferred.

The amount of the comonomer, the metal salt of styrene sulfonic acid, in the copolymer should be about 2–10 weight percent, preferably 2–6 weight percent, and most preferably in the range of 4–5 weight percent.

If the comonomer content is too low, the plastisol will be unstable and the fused product will be weak. If the comonomer content is too high, the polymer will have poor compatibility with the plasticizer and will fuse too slowly. The copolymer typically has a number average molecular weight ("Mn") of about 350,000 and a weight average molecular weight ("Mw") of about 2,000,000; both measurements are taken by gel permeation chromatography. The copolymer emulsion is spray dried and the resulting powder is dispersed in plasticizer to make a plastisol.

An alternative, prior art method to make chemically similar polymers involves sulfonation of polystyrene in organic solvent followed by neutralization with base. Although polymers made by the sulfonation process are application in this invention, the emulsion polymerization route is preferred because a) it allows precise control of the amount of sulfonated groups in the product, b) the spray drying of the emulsion can be readily controlled to produce a polymer powder of requisite properties for a suitable plastisol, and c) emulsion polymerization is economically more attractive than the solvent sulfonation process.

The Plasticizers

Operable plasticizers include most of those commonly used for PVC plastisols. They include alkyl phthalates, isophthalates and terephthalates, especially di-2-ethylhexyl phthalate (commonly called dioctyl phthalate), diisononyl phthalate and other alkyl phthalates having alkyl groups of 2-20 carbons, especially 7-12 carbons, either branched or unbranched, and mixtures thereof. Also included are alkyl aryl phthalates such as butyl benzyl phthalate. Other operable classes of plasticizers are dialkyl adipates, dialkyl glutarates, dialkyl azelates, dialkyl sebacates and trialkyl trimellitates, where alkyl groups are as defined as above for the phthalates. Also operable are polyether or polyester dibenzoates such as polyethylene glycol 200 dibenzoate. Another class of operable plasticizers are the citrates, as exemplified by tributyl citrate and acetyl tributyl citrate. Another class of plasticizers are the phosphate esters such as tricresyl phosphate, isopropylated triphenyl phosphate and mixtures thereof. Other operable plasticizers include epoxidized natural products such as epoxidized soybean oil and epoxidized 2-ethylhexyl tallate. Another operable plasticizer is N-ethyltoluenesulfonamide. Many other plasticizers not explicitly mentioned above are also believed to be operable.

The following Examples serve to illustrate the invention without limiting its scope in the scope of the claims which follow.

COMPARATIVE EXAMPLE WITH POLYSTYRENE HOMOPOLYMER

A polystyrene homopolymer powder (TYREZ DL-2763 from Reichhold Chemical Company) was mixed with an equal weight of dioctyl phthalate plasticizer to form a mobile white paste. After standing 1 hour at room temperature, the paste had increased in viscosity, and after 2 hours it had the consistency of a gum. When it was fused at 180° C. for 40 minutes, it became a weak, easily deformable, rubbery solid that would be unsuitable as a sealant.

Example 1

(a) Emulsion Copolymerization

In a 4-l resin kettle, a mixture of 2500 g water and 8.72 g Dowfax 2EP (a 50% solution of sodium dodecyl diphenyloxide disulfonate, sold by Dow Chemical Co.) was stirred under $N_2$ blanket. To the mixture was added 43.95 g of 82% sodium styrene sulfonate with 57.6 g of water. Styrene (828.14 g) was added and the mixture was heated with stirring. When the temperature reached 70° C., 4.36 g of potassium persulfate was added with 57.6 g of water. The initial exotherm was controlled by use of an ice bath and the temperature was then maintained by heating at 70° C. for 5½ hours.

(b) Spray Drying of Emulsion

The emulsion from step (a) was spray dried in a portable spray dryer from Niro, Inc. of Columbia, Md., using a two-fluid nozzle maintaining the air outlet temperature at about 85°-95° C. The resulting powder had the following properties: mean diameter 11 microns, surface area 3 $m^2/g$, water content 0.88%.

(c) Plastisol Preparation and Evaluation

A liquid plastisol was prepared by mixing 100 parts by weight of the polymer from step (b) with 80 parts by weight of diisononyl phthalate. The plastisol had an initial viscosity of 3400 cp at 43° C. After two weeks at ambient temperature the plastisol showed no settling, and the viscosity had risen to 6000 cp at 43° C. A sample of the original plastisol applied to a 206° C. hot plate fluxed to a clear film in 4 minutes. Another sample was fluxed at 200° C./30 minutes and the resulting film was tough and flexible.

What is claimed is:

1. A plastisol for a container sealant made of about 25-85 weight percent of a plasticizer and a copolymer of styrene with a metal salt of styrene sulfonic acid, wherein the copolymer contains about 2-8 weight percent of the salt.

2. The plastisol of claim 1, wherein the copolymer contains about 2 to 6 weight percent of the salt.

3. The plastisol of claim 1, wherein the copolymer contains about 4 to 5 weight percent of the salt.

4. The plastisol of claim 1, wherein the metal is sodium.

5. The plastisol of claim 1, wherein the plasticizer is di-2-ethylhexyl phthalate, diisononyl phthalate, or mixtures thereof.

6. The plastisol of claim 1, wherein the plasticizer is diisononyl phthalate.

7. A process for making a plastisol, the steps comprising copolymerizing styrene and a metal salt of styrene sulfonic acid, wherein the resulting copolymer contains about 2-8 weight percent of the salt, spray-drying the copolymer, and adding a plasticizer wherein the plasticizer is 25-85% by weight of the total composition.

8. The process of claim 7, wherein the copolymer contains about 2 to 6 weight percent of the salt.

9. The process of claim 7, wherein the copolymer contains about 4 to 5 percent of the salt.

10. The process of claim 7, wherein the metal is sodium.

11. The process of claim 7, wherein the plasticizer is di-2-ethylhexyl phthalate, diisononyl phthalate, or mixtures thereof.

12. The Process of claim 7, wherein the plasticizer is diisononyl phthalate.

* * * * *